(12) United States Patent
Hashimoto et al.

(10) Patent No.: US 6,624,867 B2
(45) Date of Patent: *Sep. 23, 2003

(54) LIQUID CRYSTAL DISPLAY UNIT AND ELECTRONIC APPARATUS PROVIDED WITH THE LIQUID CRYSTAL DISPLAY UNIT

(75) Inventors: Junichi Hashimoto, Tokyo (JP); Koichi Ito, Tokyo (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/265,260

(22) Filed: Mar. 9, 1999

(65) Prior Publication Data
US 2002/0158998 A1 Oct. 31, 2002

(30) Foreign Application Priority Data
Mar. 10, 1998 (JP) .......................................... 10-058099

(51) Int. Cl.⁷ ...................... G02F 1/1333; G02F 1/1345
(52) U.S. Cl. ......................................... 349/149; 349/58
(58) Field of Search .......................... 349/58, 149, 150, 349/152

(56) References Cited

U.S. PATENT DOCUMENTS

| | | | | |
|---|---|---|---|---|
| 5,436,745 A | * | 7/1995 | Voisin et al. | 359/88 |
| 5,670,994 A | * | 9/1997 | Kawaguchi et al. | 345/206 |
| 5,946,061 A | * | 8/1999 | Kurihara et al. | 349/58 |
| 6,010,757 A | * | 1/2000 | Yamamoto et al. | 428/1 |

FOREIGN PATENT DOCUMENTS

| | | | |
|---|---|---|---|
| JP | 5-249479 | * | 9/1993 |
| JP | 11-261676 | * | 9/1999 |

* cited by examiner

Primary Examiner—Robert H. Kim
Assistant Examiner—Dung Nguyen
(74) Attorney, Agent, or Firm—Finnegan, Henderson, Farabow, Garrett & Dunner, L.L.P.

(57) ABSTRACT

The present invention concerns electronic equipment having a liquid crystal display that is capable of reducing the external size of the electronic equipment by reducing installation space, while increasing display area. A display part and a pattern wiring area of a liquid crystal display are comprised of films and an edge part defining an area of the liquid crystal display. Moreover, display portion includes a display surface facing a display window of the electronic equipment and extending along a horizontal direction, and at least one pattern wiring area defining a peripheral edge of the display portion, the pattern wiring area being bent such that the at least one pattern wiring area extends along a vertical direction.

28 Claims, 11 Drawing Sheets

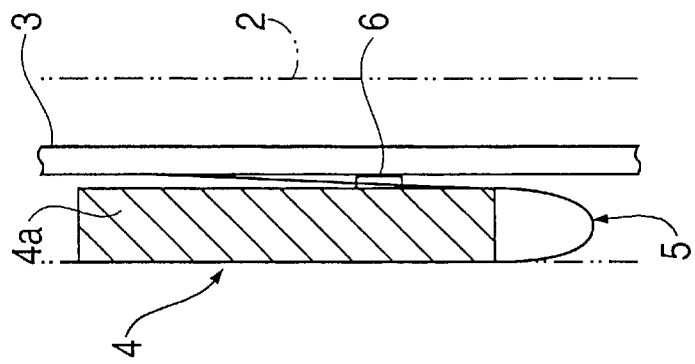
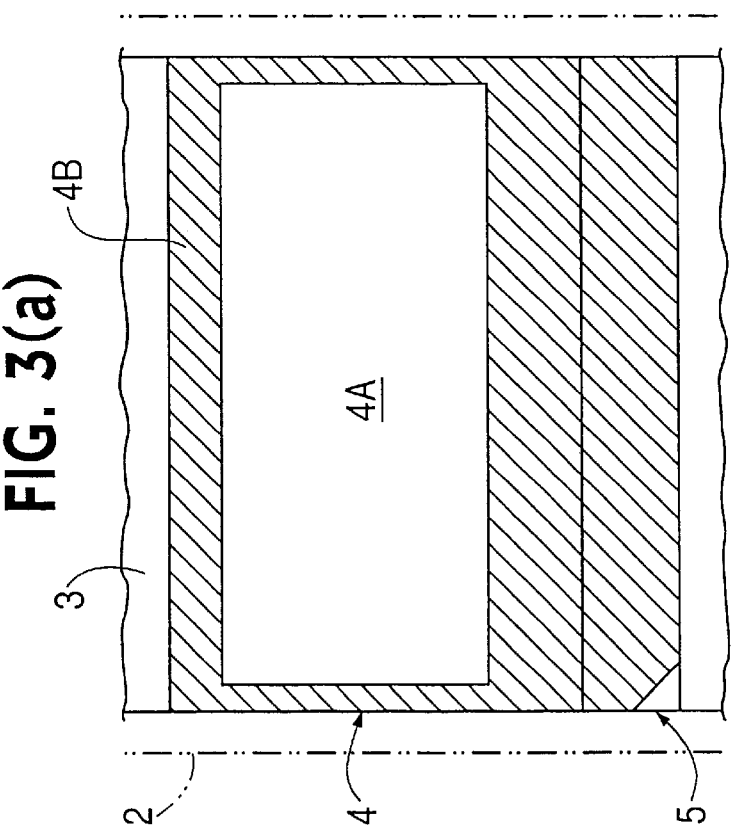
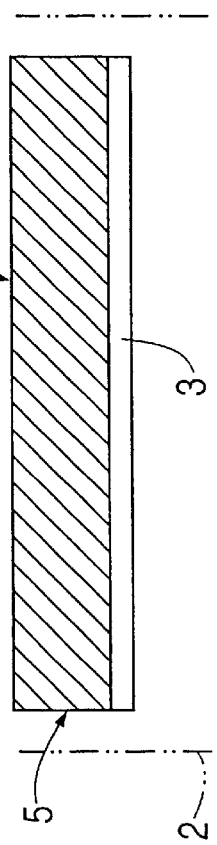

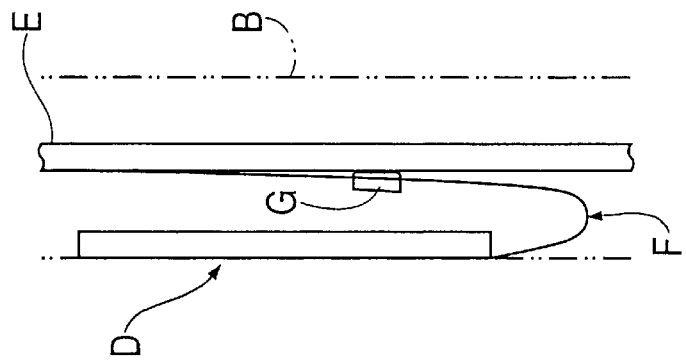
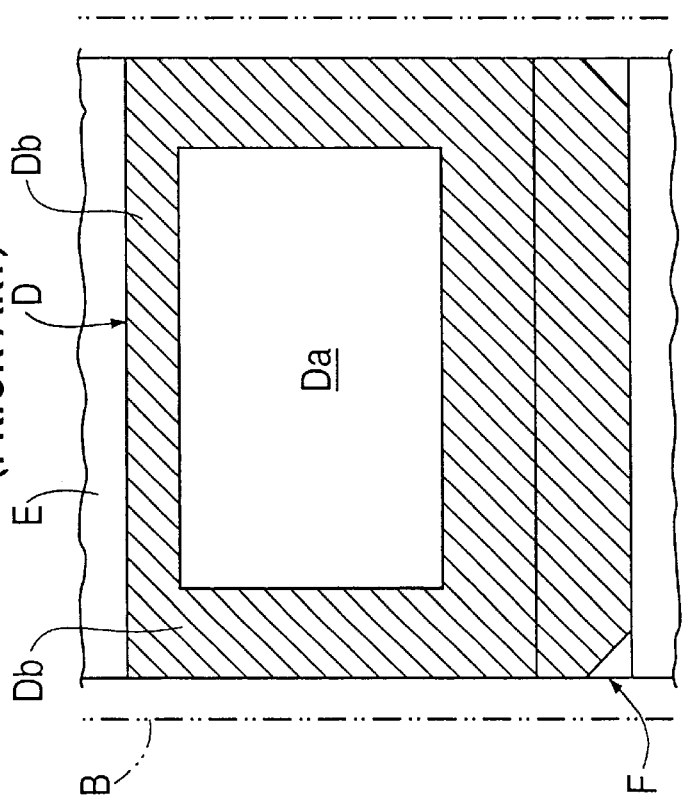
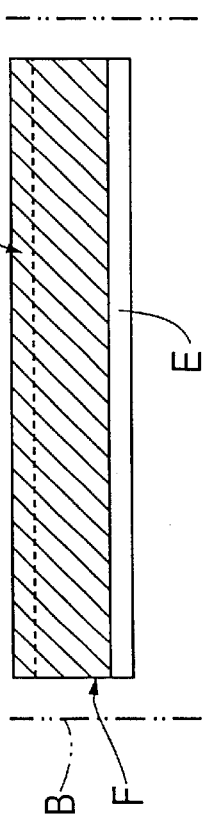

LIQUID CRYSTAL DISPLAY UNIT AND ELECTRONIC APPARATUS PROVIDED WITH THE LIQUID CRYSTAL DISPLAY UNIT

BACKGROUND OF THE INVENTION

1. Field of the Invention

The present invention relates to a liquid crystal display unit and a small-sized electronic apparatus provided with the liquid crystal display unit.

2. Description of the Related Art

For example, in a mobile telephone apparatus having a function to display various kinds of information, a liquid crystal display unit (LCD) is generally used as its display device.

In a conventional mobile telephone apparatus A shown in FIGS. 13 to 16, a liquid crystal display unit (glass LCD) D faces on a display window C disposed in a casing B. The liquid crystal display unit D is attached to a circuit substrate E through a not-shown holder, and is connected to the circuit substrate E through a flexible substrate F.

As shown in FIG. 15, the flexible substrate F connected to the liquid crystal display unit D includes a wiring pattern Fa and a substrate connection portion Fb, and an LCD driver G is attached thereto.

As shown in FIGS. 14 to 16, the conventional liquid crystal display unit D includes a display portion Da as an area on which character information or the like is displayed, and a pattern wiring area Db for supplying a control signal to the display portion Da. The pattern wiring area Db is disposed in such a state that it surrounds the periphery of the display portion Da.

Thus, the mobile telephone apparatus A incorporating the conventional liquid crystal display unit D has a disadvantage that the liquid crystal display unit D occupies a wide installation space.

In the conventional liquid crystal display unit D, the width of the display portion Da on which character information or the like is displayed has a size obtained by subtracting the width of the right and left pattern wiring areas Db, Db from the entire width of the liquid crystal display unit D. So, if the liquid crystal display unit D is incorporated in the mobile telephone apparatus A, a display area relative to the width of the casing B becomes narrow.

In the case where the width of the display area is set wide, the width of the casing B becomes relatively large, so that there is a disadvantage that the mobile telephone apparatus A is caused to become large.

SUMMARY OF THE INVENTION

In view of the foregoing circumstances, an object of the present invention is to provide a liquid crystal display unit which can prevent an installation space from increasing, and which, when it is incorporated in an electronic apparatus, can attain miniaturization of the exterior of the apparatus and enlargement of its display area.

Another object of the invention is to provide an electronic apparatus provided with a liquid crystal display unit which can attain miniaturization of its exterior and enlargement of its display area.

In order to achieve the above objects, according to an aspect of the invention, a liquid crystal display unit comprises a display portion, a pattern wiring area disposed around a periphery of the display portion and an edge portion including at least a part of the pattern wiring area being disposed to be positioned in a direction different from the display portion.

Moreover, in order to achieve the above objects, according to another aspect of the invention, an electronic apparatus including a liquid crystal display unit comprises a display portion, a pattern wiring area disposed around a periphery of the display portion and an edge portion including at least a part of the pattern wiring area being disposed to be positioned in a direction different from the display portion.

BRIEF DESCRIPTION OF THE DRAWINGS

FIGS. 3A to 3C are a front view, a top view, and a side view showing the installation state of a liquid crystal display unit in the mobile telephone apparatus shown in FIG. 1, respectively;

FIGS. 16A to 16C are a front view, a top view, and a side view showing the installation state of the conventional liquid crystal display unit.

DETAILED DESCRIPTION OF THE PREFERRED EMBODIMENTS

Preferred embodiments of the present invention will be described below with reference to the attached drawings.

Figure 1:
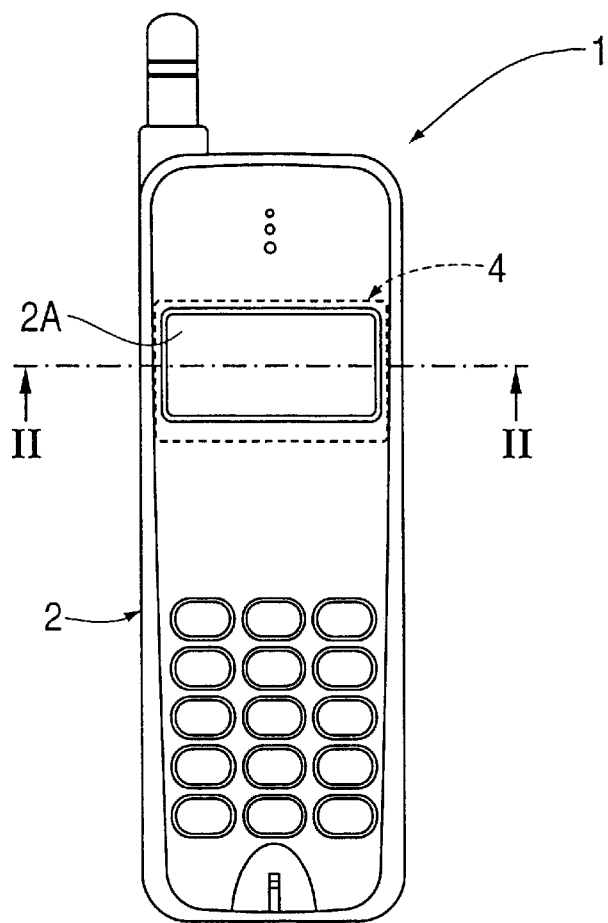
FIG. 1 is a front view showing a mobile telephone apparatus as a small-sized electronic apparatus of the present invention.
Figure 2:
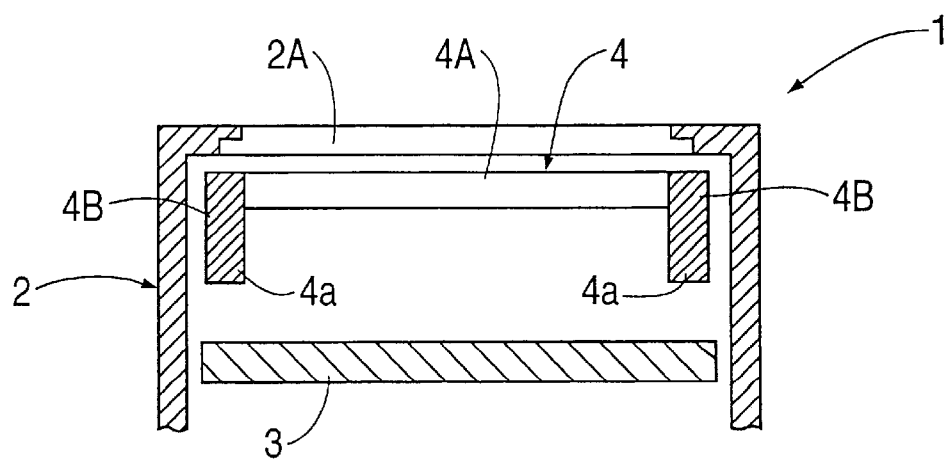
FIG. 2 is a conceptual sectional view taken along line II—II of FIG. 1.

FIGS. 1 and 2 show a mobile telephone apparatus as a small-sized electronic apparatus provided with a liquid crystal display unit to which the invention is applied.

In this mobile telephone apparatus 1, a display window 2A made of a transparent material is disposed on the front of a casing 2, and a circuit substrate 3 is contained inside the casing 2. A liquid crystal display unit (hereinafter referred to as an LCD) 4 is disposed over the circuit substrate 3 in such a state that it faces on the display window 2A.

The LCD 4 is a so-called film LCD made of a soft film material. As shown in FIGS. 3A to 3C and 4, the LCD includes a display portion 4A as an area on which character information or the like, such as telephone number, is displayed and a pattern wiring area 4B for supplying a control signal to the display portion 4A. The pattern wiring area 4B is disposed in such a state that it surrounds the periphery of the display portion 4A.

Figure 4:
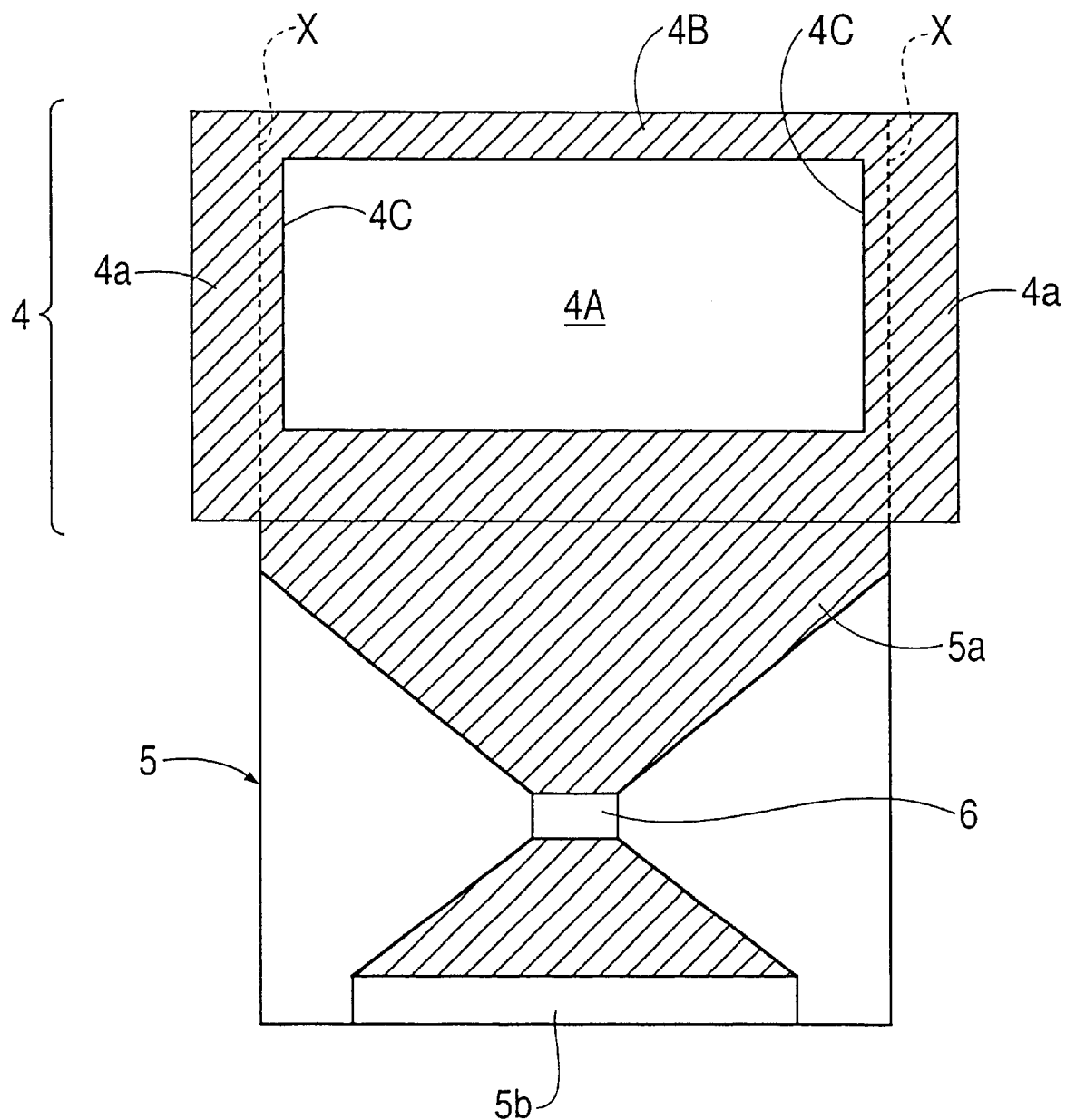
FIG. 4 is a plan view showing the liquid crystal display unit of the invention incorporated in the mobile telephone apparatus shown in FIG. 1.

In the LCD 4, along fold lines X, X, which are illustrated in FIG. 4 as being parallel to and spaced from the outermost edge 4c of display portion 4A, edge portions 4a, 4a, which include at least a part of the pattern wiring area 4B, are bent downward in the vertical direction of the surface of the sheet of FIG. 4. Specifically, the edge portions 4a, 4a are directed downward vertically relative to the display portion 4a extending in a horizontal direction.

As shown in FIGS. 3A to 3C and 4, a flexible substrate 5 is connected to the LCD 4. The flexible substrate 5 includes a wiring pattern 5a electrically connected to the pattern wiring area 4B of the LCD 4 and a substrate connection portion 5b electrically connected to the circuit substrate 3. Further, the flexible substrate 5 includes an LCD driver (driver IC) 6.

As shown in FIGS. 2 and 3A to 3C, the LCD 4 is installed through a holder (not shown) at a predetermined position, that is, in such a state that the display portion 4A faces on the display window 2A and is adjacent to the display window 2A. The flexible substrate 5 is bent in such a state that it turns toward the rear side of the LCD 4, and the substrate connection portion 5b of its tip is connected to the circuit substrate 3.

In the LCD 4 having the foregoing structure, since the edge portions 4a, 4a are bent downward vertically relative to the display portion 4A extending in a horizontal direction, the installation space with respect to the circuit substrate 3 can be prevented from increasing, and in the mobile telephone apparatus 1 incorporating the LCD 4, it becomes possible to attain miniaturization of its exterior to the utmost possible degree.

Since the edge portions 4a, 4a of the LCD 4 are bent as described above, the ratio of the display portion 4A to the entire width becomes large. Thus, in the mobile telephone apparatus 1 incorporating the LCD 4 with the above structure, it becomes possible to set a display area wider than that of conventional unit.

That is, in the mobile telephone apparatus 1 with the above-described structure, in the case where the width of the casing 2 is the same as that of the conventional mobile telephone apparatus, the display area becomes much wider than that of the conventional apparatus, and in the case where the display area is made to have the same width, the width of the casing 2 can be set smaller than that of the conventional apparatus.

In the mobile telephone apparatus 1 with the foregoing structure, the right and left edge portions 4a, 4a of the LCD 4, that is, the right and left edge portions 4a, 4a adjacent to the ends of character lines displayed on the display portion 4A are bent, so that the display area with respect to the width of the casing 2 can be set wider than the conventional device. In addition, if the size of a displayed character is the same as that of the conventional device, the number of characters displayed on one character line can be increased. Moreover, if the number of characters displayed on one character line is set equal to that of the conventional apparatus, one character can be displayed in a large size. Thus, visibility can be improved.

Figure 5:
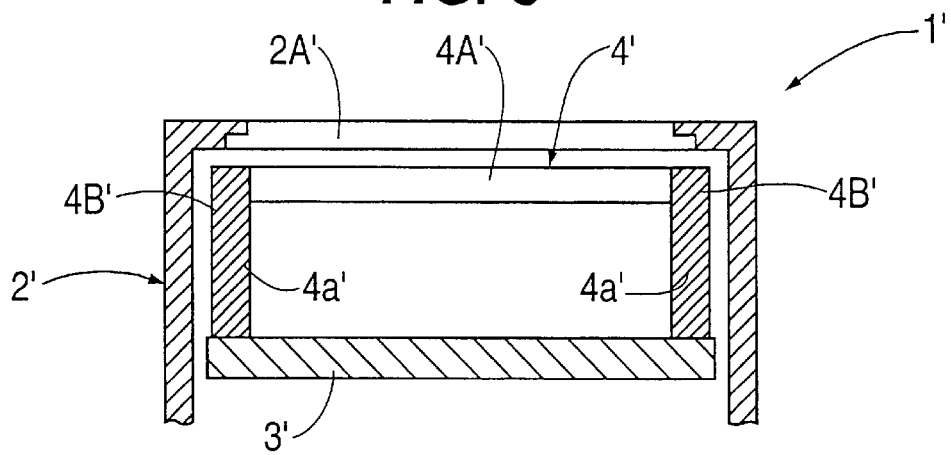
FIG. 5 is a conceptual sectional view showing a second embodiment of the invention.

FIG. 5 shows a second embodiment of the invention. In an LCD 4' incorporated in a mobile telephone apparatus 1', right and left edge portions 4a', 4a' bent downward are in contact with the surface of a circuit substrate 3'. These right and left edge portions 4a', 4a' function as supporting members so that the circuit substrate 3' supports the display portion 4A'.

The structure of the mobile telephone apparatus 1' is basically the same as the structure of the mobile telephone apparatus 1 shown in FIGS. 1 to 3A–3C except the edge portions 4a', 4a' in the LCD 4'. Thus, elements of the mobile telephone apparatus 1' having the same function as the elements of the mobile telephone apparatus 1 are denoted in FIG. 5 by the same reference characters as those in the FIGS. 1 to 3A–3C with ' (dash), and their detailed description is omitted.

According to the mobile telephone apparatus 1' with the foregoing structure, in addition to the functions and effects of the mobile telephone apparatus 1 shown in FIGS. 1 to 3A–3C, a holder (not shown) for attaching the LCD 4 to the circuit substrate 3 in the mobile telephone apparatus 1 becomes unnecessary. In other words, right and left edge portions 4a', 4a' play a role as the holder for the LCD 4. So, it becomes possible to reduce the number of parts constituting the mobile telephone apparatus 1' and the number of assembling steps.

In other words, according to the LCD 4' with the foregoing structure, in addition to the functions and effects of the LCD 4 shown in FIGS. 2 to 4, it becomes possible to reduce the number of parts and the number of assembling steps in the mobile telephone apparatus 1' incorporating the LCD 4'.

Figure 6:
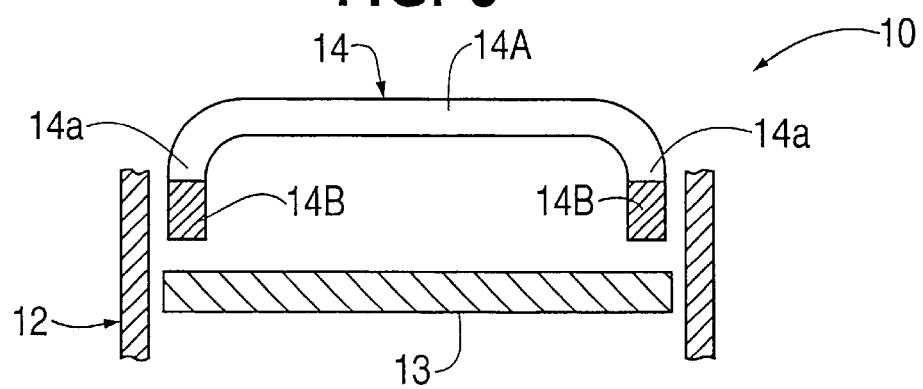
FIG. 6 is a conceptual sectional view showing a third embodiment of the invention.

FIG. 6 shows a third embodiment of the invention. In an LCD 14 incorporated in a mobile telephone apparatus 10, edge portions 14a, 14a including a pattern wiring area 14B and a convex part of a display portion 10A are bent downward as shown in FIG. 6.

In the drawing, reference numeral 12 denotes a casing, and 13 denotes a circuit substrate. A mechanical installation state of the LCD 14 into a casing 12, and an electrical installation state of the LCD 14 and the circuit substrate 13 are not basically different from the mobile telephone apparatus 1 and the LCD 4 shown in FIGS. 1 to 4.

As shown in FIG. 6, the display portion 14A has a horizontal surface and two curved surfaces. As compared with the embodiments shown in FIG. 2 and FIG. 5, the shape of the sectional view of LCD 14 is different from that of LCD 4,4'. These curved surfaces can make the width of the display area being able to display the character much wider than that of the conventional unit.

According to the mobile telephone apparatus 10 with the foregoing structure, a display area of the LCD 14 can be set large to the utmost possible degree with respect to the entire width of the casing 12, and visibility of character information can be improved.

Figure 7:
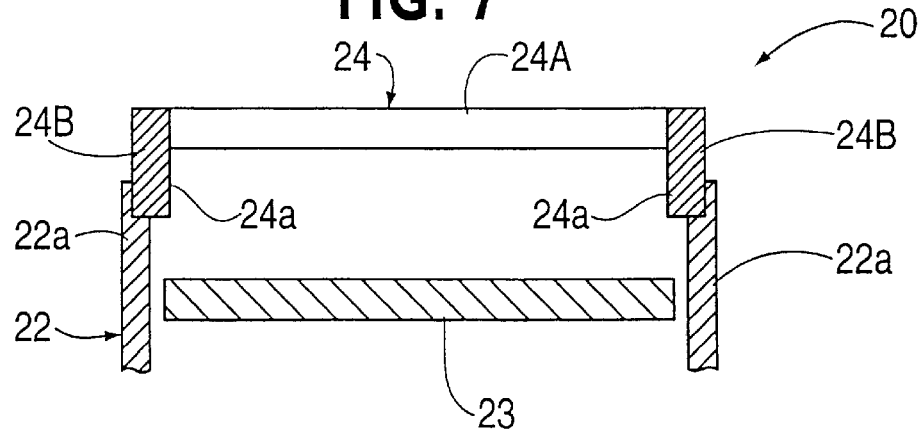
FIG. 7 is a conceptual sectional view showing a fourth embodiment of the invention.

FIG. 7 shows a fourth embodiment of the invention. In an LCD 24 incorporated in a mobile telephone apparatus 20, edge portions 24a, 24a including a pattern wiring area 24B are bent downward, and the respective edge portions 24a, 24a are engaged with side walls 22a, 22a of a casing 22.

The right and left edge portions 24a, 24a in the LCD 24 function as supporting members so that the casing 22 supports the display portion 24A, and the LCD 24 constitutes a part of the casing 22 of the mobile telephone apparatus 20.

In the drawing, reference numeral 23 denotes a circuit substrate, and an electrical installation state of the LCD 24 and the circuit substrate 23 is not basically different from the mobile telephone apparatus 1 and the LCD 4 shown in FIGS. 1 to 4.

According to the mobile telephone apparatus 20 with the foregoing structure, a display area of the LCD 24 can be set large up to the entire width of the casing 22, and visibility of character information can be improved. In addition, the number of parts and the number of assembling steps in the mobile telephone apparatus 20 incorporating the LCD 24 can be reduced.

Figure 8A:
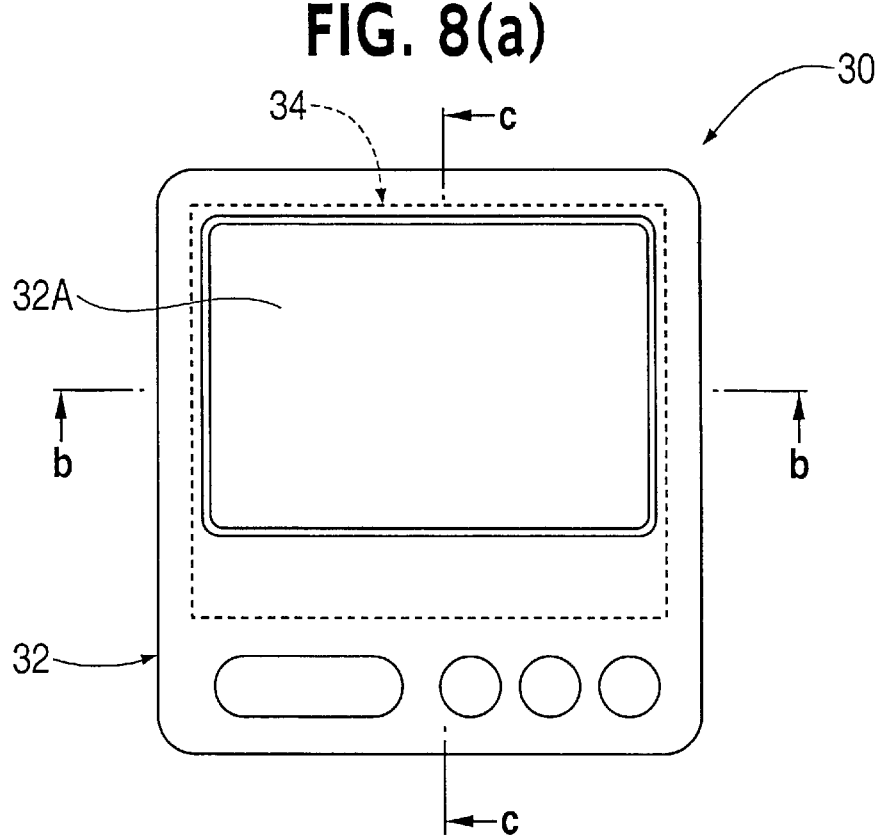
FIGS. 8A to 8C are a front view of a pager of a fifth embodiment of the invention, a conceptual sectional view taken along line b—b in FIG. 8A, and a conceptual sectional view taken along line c—c in FIG. 8A, respectively.
Figure 8B:
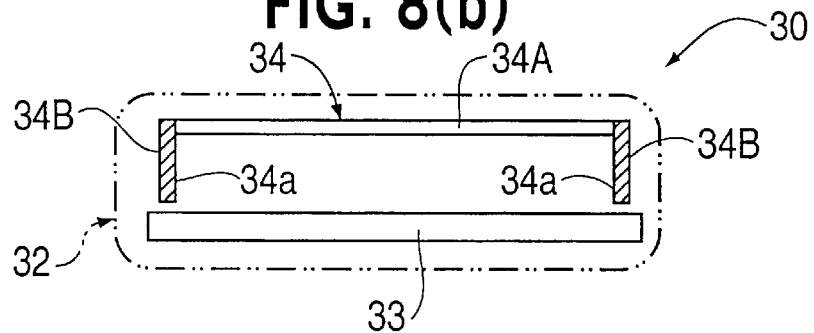
Figure 8C:
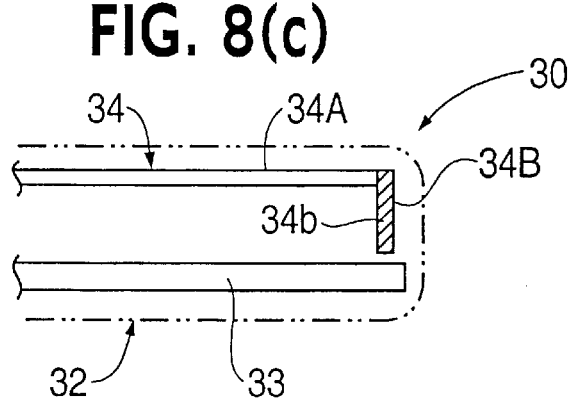

FIGS. 8A to 8C show a pager (selective paging receiver) as a small-sized electronic apparatus provided with a liquid crystal display unit to which the invention is applied. This pager 30 includes a casing 32, and a display window 32A made of a transparent material on the front of the casing 32. A circuit substrate 33 is contained inside the casing 32, and an LCD 34 is installed to the circuit substrate 33 in such a state that it faces on the display window 32A.

Figure 9:
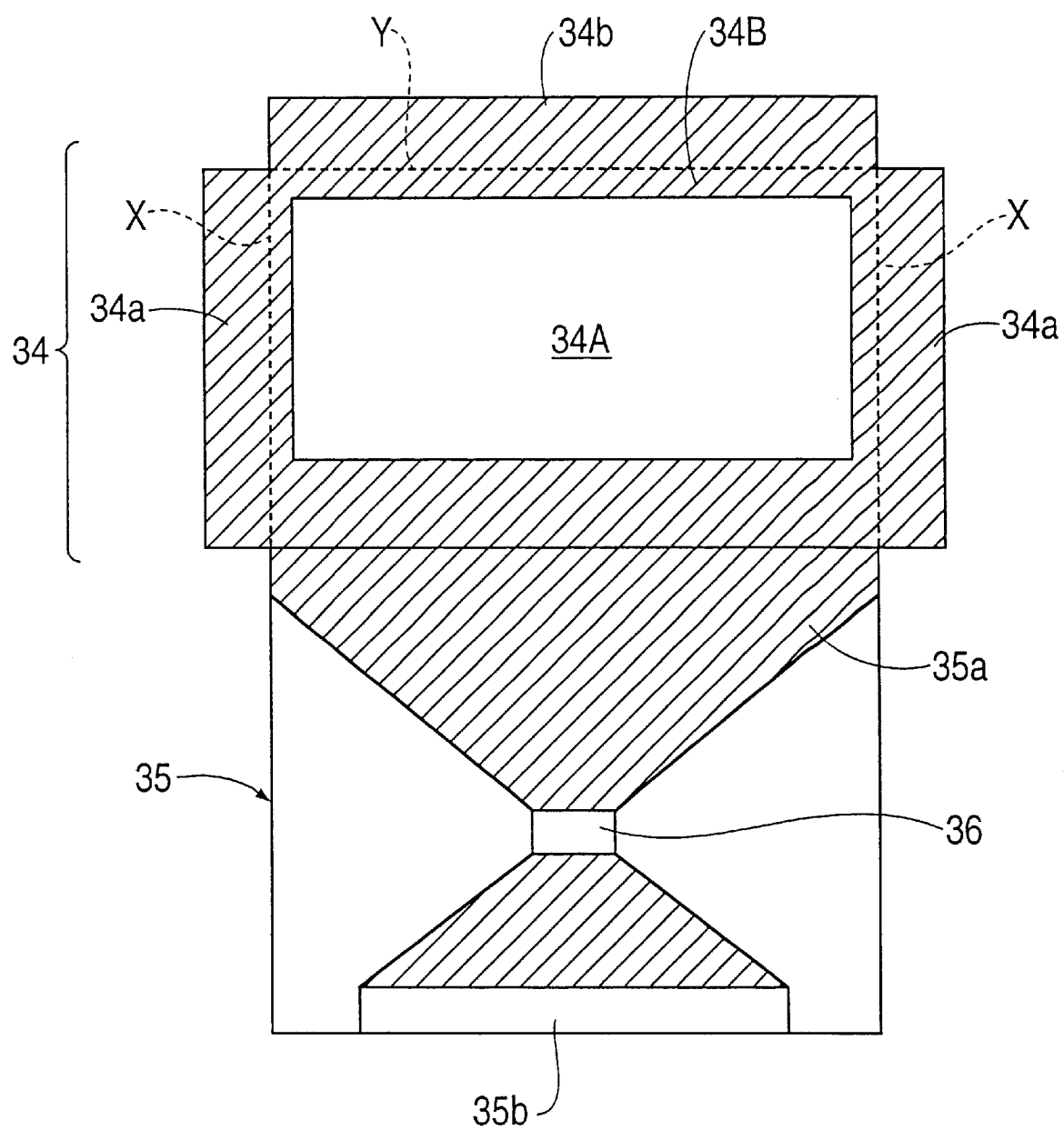
FIG. 9 is a plan view showing a liquid crystal display unit of the invention incorporated in the pager shown in FIGS. 8A to 8C.

The LCD 34 is a film LCD with a base of a soft film material, and as shown in FIG. 9, the LCD includes a display portion 34A and a pattern wiring area 34B disposed in such a state that it surrounds the periphery of the display portion 34A.

In the LCD 34 shown in FIG. 9, right and left edge portions 34a, 34a including at least a pattern wiring area 34B are bent downward the vertical direction of the surface of the sheet of FIG. 9 along fold lines X, X. Further, an edge portion 34b including at least the pattern wiring area 34B is bent downward the vertical direction of the surface of the sheet of FIG. 9 along a fold line Y.

Further, a flexible substrate 35 is connected to the LCD 34. The flexible substrate 35 includes a wiring pattern 35a and a substrate connection portion 35b, and is further provided with an LCD driver (driver IC) 36.

A mechanical installation state of the LCD 34 with respect to the circuit substrate 33 and an electrical installation state of the LCD 34 and the circuit substrate 33 are not basically different from the mobile telephone apparatus 1 and the LCD 4 shown in FIGS. 1 to 4.

In the LCD 34 with the foregoing structure, the right and left edge portions 34a, 34a and the upper edge portion 34b are bent, so that an installation space with respect to the circuit substrate 33 can be prevented from increasing. According to the pager 30 incorporating the LCD 34, the right-and-left width and the up-and-down height of the casing 32 in the state where the LCD confronts the display window 32A can be set small to the utmost possible degree, and a display area with respect to the width of the casing 32 can be set wide.

Figure 10A:
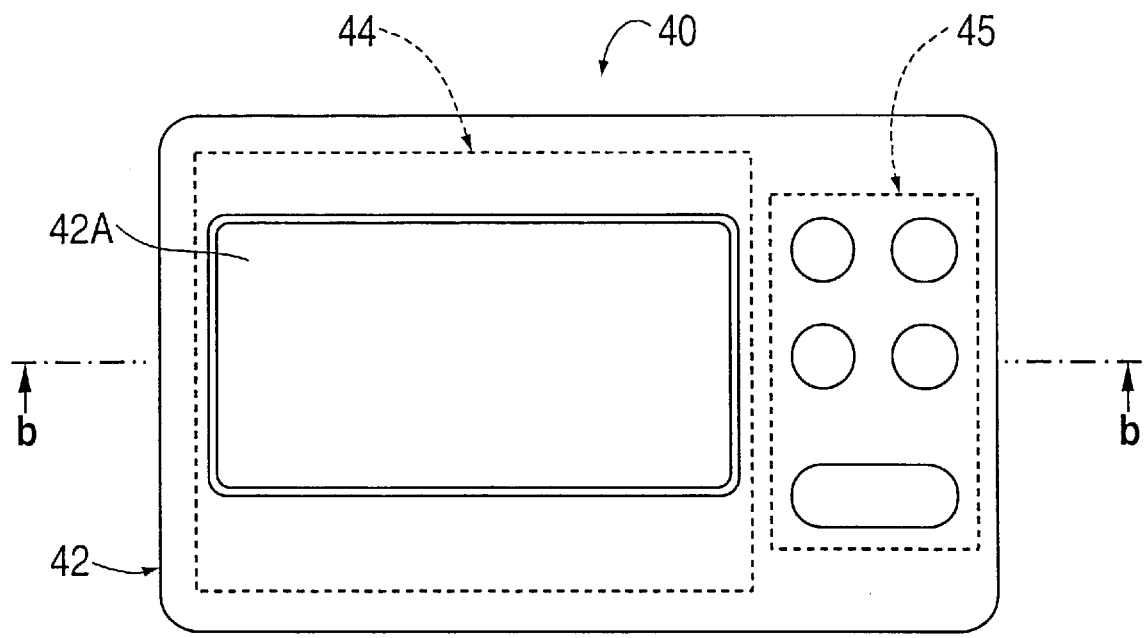
FIGS. 10A and 10B are a front view showing a pager of a sixth embodiment of the invention, and a conceptual sectional view taken along line b—b in FIG. 10A, respectively.
Figure 10B:
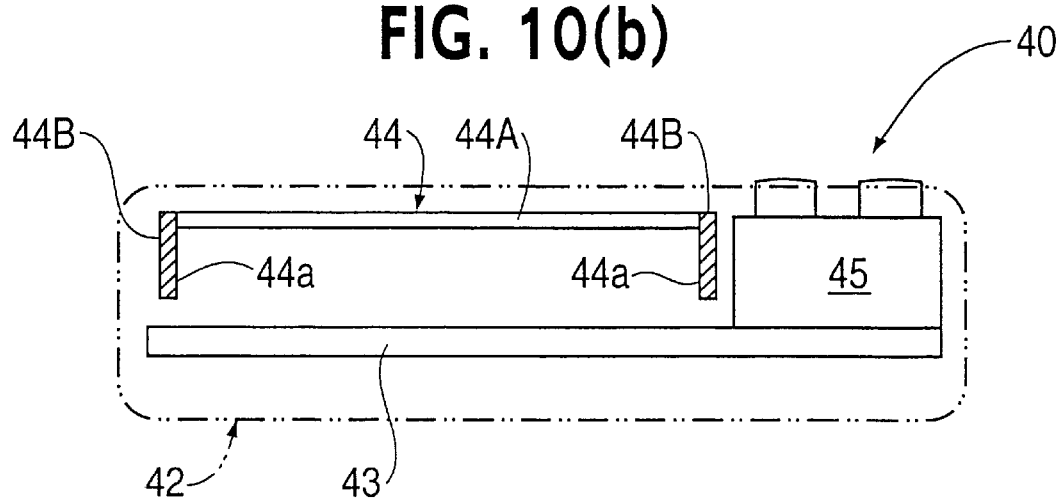

FIGS. 10A and 10B show a pager (selective paging receiver) to which the invention is applied.

This pager 40 includes a display window 42A made of a transparent material on the front of a casing 42, and a circuit substrate 43 contained inside the casing 42. An LCD 44 is installed to the circuit substrate 43 in such a state that it faces on the display window 42A. A press button switch unit 45 is installed at a side portion relative to the LCD 44.

The structure of the LCD 44 itself is basically the same as the LCD 4 shown in FIGS. 3A to 3C and 4. Moreover, a mechanical installation state of the LCD 44 with respect to the circuit substrate 43 and an electrical installation state of the LCD 44 and the circuit substrate 43 are not basically different from the mobile telephone apparatus 1 and the LCD 4 shown in FIGS. 1 to 4.

In the pager 40 with the foregoing structure, at the side portion relative to the LCD 44, particularly at the side portion relative to a place where the edge portion 44a is bent, the press button switch unit 45 as an electronic part is installed, so that the width of the casing 42 in the right-and-left direction can be prevented from increasing to the utmost possible degree.

In the pager 40, as a small-sized electronic apparatus, incorporating the LCD 44 of the invention, even in a layout in which other electronic parts, for example, the press button switch unit 45 is adjacent to the LCD 44, the exterior can be miniaturized to the utmost possible degree, and it becomes possible to set a display area wide with respect to the width of the casing 42.

Figure 11:
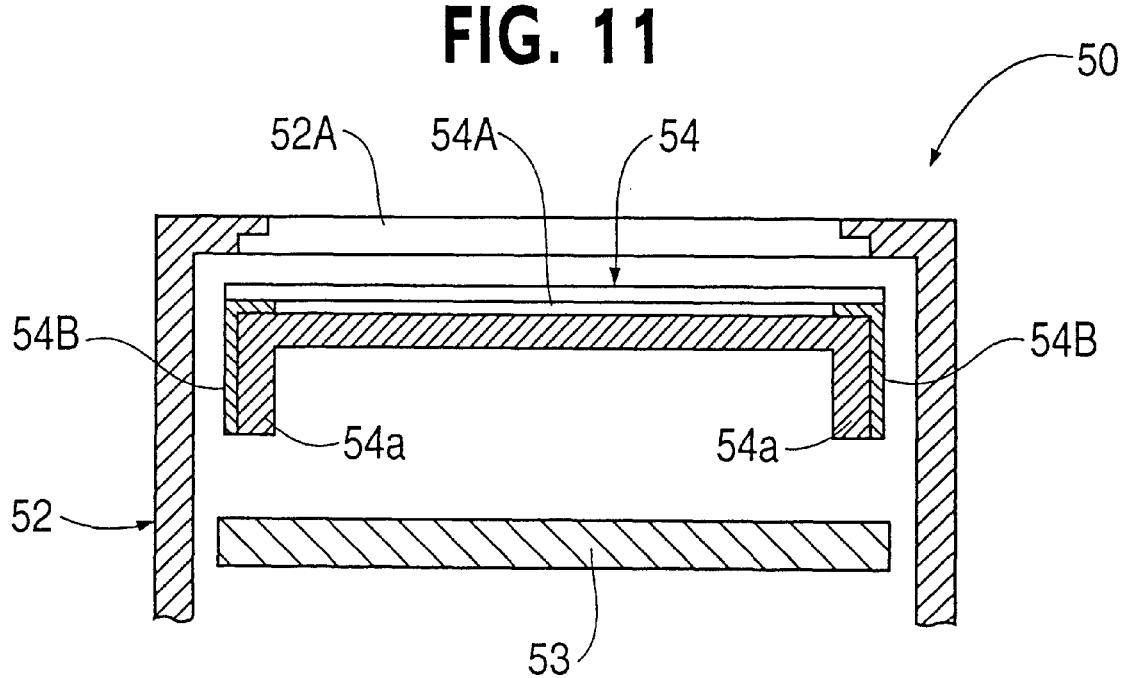
FIG. 11 is a conceptual sectional view showing a seventh embodiment of the invention.
Figure 12:
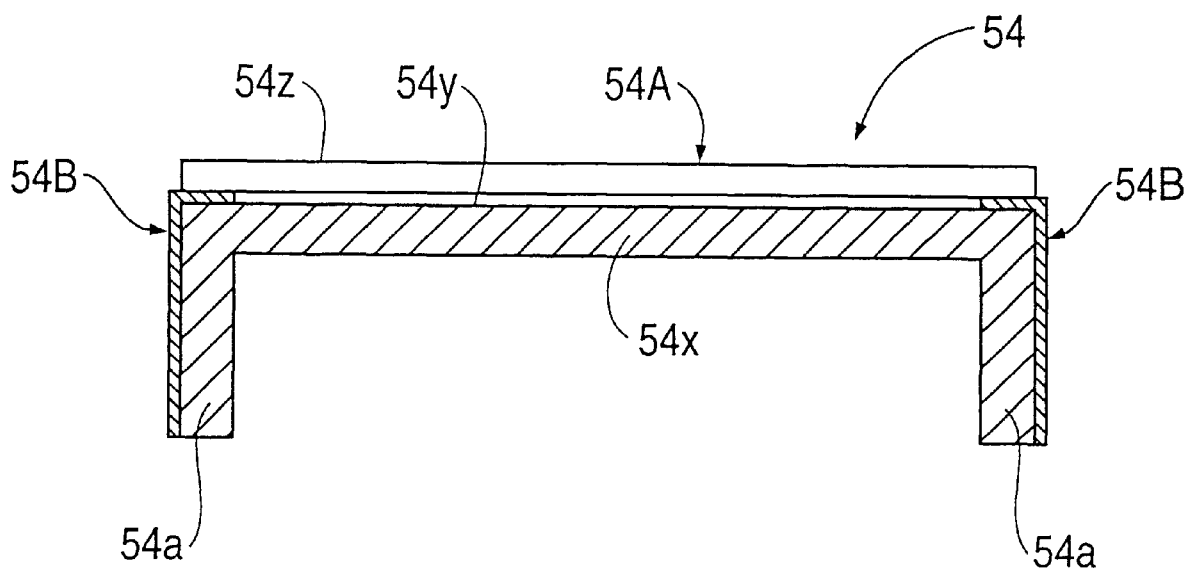
FIG. 12 is a conceptual sectional view of a liquid crystal display unit in the seventh embodiment shown in FIG. 11.
Figure 13:
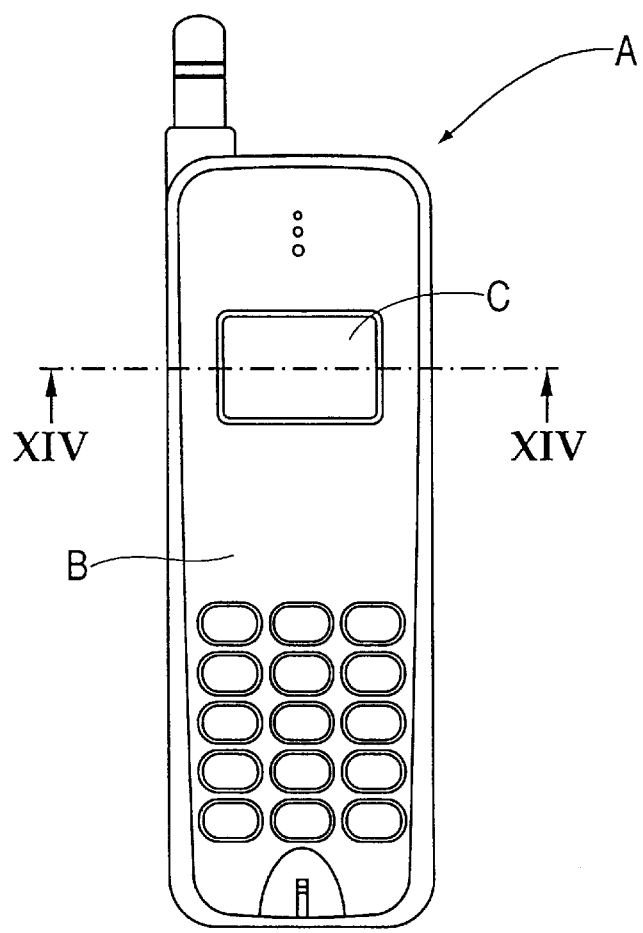
FIG. 13 is a front view showing a mobile telephone apparatus as a small-sized electronic apparatus incorporating a conventional liquid crystal display unit.
Figure 14:
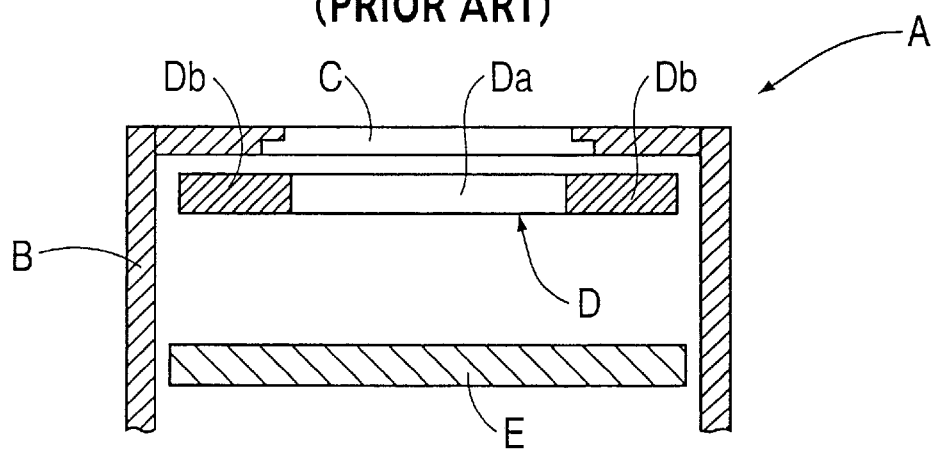
FIG. 14 is a conceptual sectional view taken along line XIV—XIV of FIG. 13.
Figure 15:
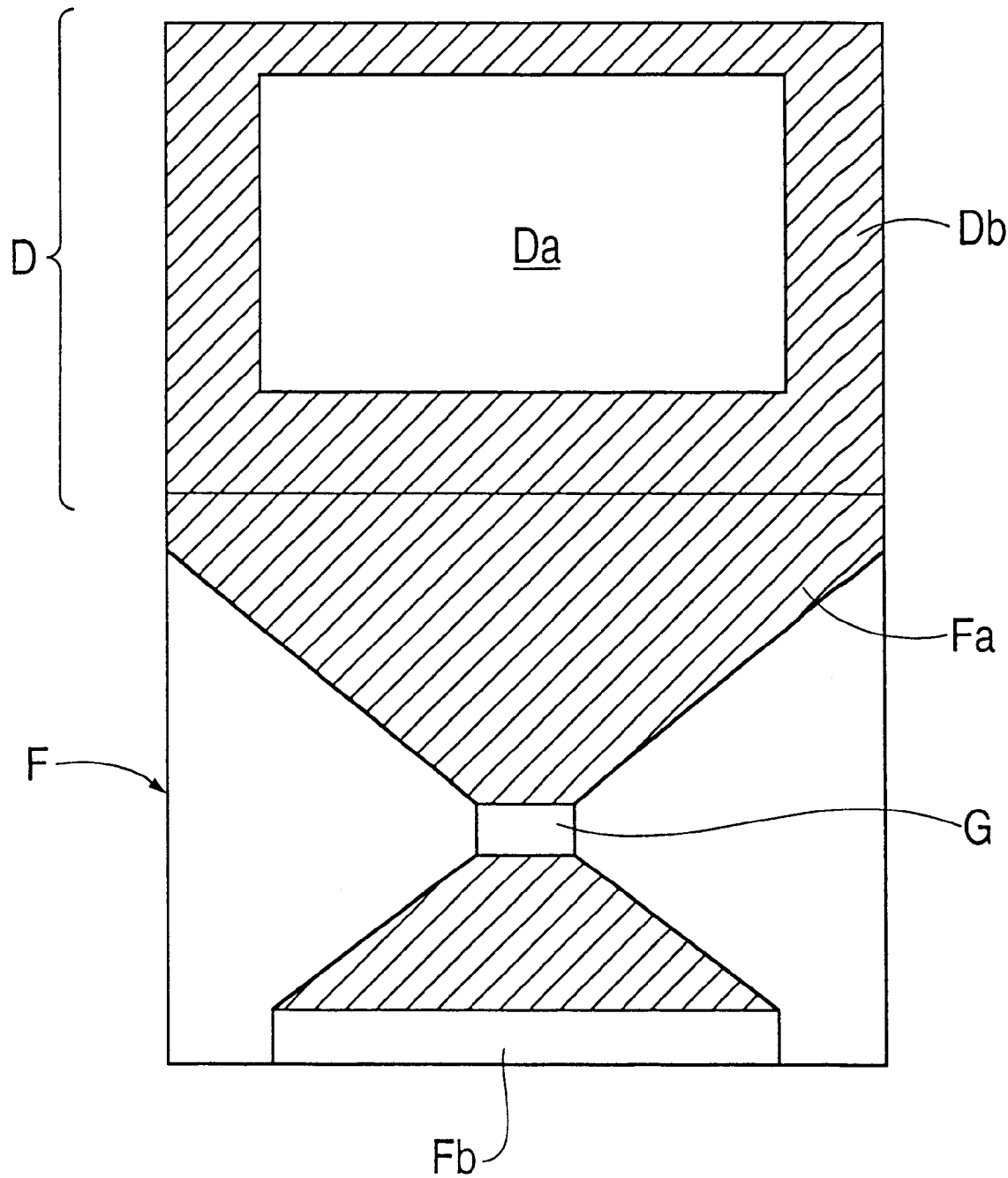
FIG. 15 is an unfolded plan view showing the conventional liquid crystal display unit.

FIGS. 11 and 12 show a mobile telephone apparatus as a small-sized electronic apparatus provided with a liquid crystal display unit to which the invention is applied. This mobile telephone apparatus 50 includes a display window 52A made of a transparent material on the front of a casing 52. A circuit substrate 53 is contained inside the casing 52, and an LCD 54 is installed to the circuit substrate 53 in such a state that it faces on the display window 52A.

The LCD 54 includes a base 54x made of a resin molding with a downward recess-shaped section, a liquid crystal layer 54y disposed on the upper surface of the base 54x, and a transparent cover 54z covering the liquid crystal layer 54y. Further, the LCD includes a display portion 54A as an area on which character information or the like, such as telephone number, is displayed, and a pattern wiring area 54B for supplying a control signal to the display portion 54A.

The base 54x and the cover 54z are both resin moldings formed by injection molding or the like, and in other words, in the LCD 54, the display portion 54A and the pattern wiring area 54B are constituted by the resin moldings.

The base 54x shows the downward recess shape, and edge portions 54a, 54a including at least a part of the pattern wiring area 54B are disposed in such a state that they are directed in a direction different from the display portion 54A, specifically they are directed downward vertically with respect to the display portion 54A extending in a horizontal direction.

In the mobile telephone apparatus 50, a mechanical installation state of the LCD 54 with respect to the circuit substrate 53, and an electrical installation state of the LCD 54 and the circuit substrate 53 are not basically different from the mobile telephone apparatus 1 and the LCD 4 shown in FIGS. 1 to 4.

In the LCD 54 having the foregoing structure, since the edge portions 54a, 54a are positioned in the direction different from the display portion 54A, an installation space with respect to the circuit substrate 53 can be prevented from increasing. In the mobile telephone apparatus 50 incorporating the LCD 54, it becomes possible to attain miniaturization of its exterior to the utmost possible degree.

Since the edge portions 54A, 54A of the LCD 54 are positioned in the direction different from the display portion 54A, the ratio of the display portion 54A to the entire width of the LCD 54 becomes large. In the mobile telephone apparatus 50 incorporating the LCD 54 of the above structure, it becomes possible to set a display area wide with respect to the width of the casing 52.

That is, in the mobile telephone apparatus 50 of the forgoing structure, in the case where the width of the casing 52 is the same as the conventional mobile telephone apparatus, the display area becomes much wider than that of the conventional device, and in the case where the display area is made to have the same width, the width of the casing 52 can be set smaller than the conventional device.

In the mobile telephone apparatus 50 with the foregoing structure, since the right and left edge portions 54a, 54a adjacent to the ends of character lines displayed on the display portion 54A are positioned in the direction different from the display portion 54A, the display area can be set wider than the conventional device. In addition, if the size of one displayed character is the same as the conventional device, the number of characters displayed on one character line can be increased, and if the number of characters displayed in one character line is set equal to that of the conventional device, an enlarged character can be displayed, so that visibility can be improved.

Instead of the film LCDs 4, 4', 14, 24. 34, 44 in the mobile telephone apparatuses 1, 1', 10, 20 and the pagers 30, and 40 shown in FIGS. 1 to 10, it is possible to adopt the LCD shown in FIGS. 11 and 12 in which the display portion and the pattern wiring area are formed of the resin moldings. The resin moldings includes general plastic material. Even in this structure, the same functions and effects as the mobile telephone apparatuses 1, 1', 10, 20, and the pagers 30 and 40 adopting the film LCD can be naturally obtained.

In the film LCDs 4, 4', 14, 24, 34, 44, 54 shown in FIGS. 1 to 11, although the edge portions are bent to be formed into a predetermined shape at the timing of assembling, it is also possible to previously mold the edge portions into a bent shape by molding means such as hot press or vacuum forming before assembling. By doing so, it becomes possible to reduce the number of operation steps at the manufacture of the electronic apparatus.

Moreover, as described above, since the LCD is formed of the film or resin molding, as compared with a conventional glass LCD, assembling is easy. Thus, it is needless to say that the LCD of any shape can be formed easily and at low cost.

Incidentally, in the respective embodiments, as a small-sized electronic apparatus provided with a liquid crystal display unit, a mobile telephone apparatus and a pager (selective paging receiver) are exemplified. However, it is needless to say that the present invention can be effectively applied to a small-sized electronic apparatus in which miniaturization of its exterior and enlargement of a display portion are desired, such as a PHS (Personal Handyphone System) and a portable personal computer.

What is claimed is:

1. A liquid crystal display unit, comprising:
    a display portion having a display surface extending along a first direction and a pattern wiring area extending from an outermost display edge portion of the display portion, the outermost display edge portion being configured within the liquid crystal display unit to display visual information; and
    wherein the pattern wiring area of the display portion is bent such that the pattern wiring area extends along a second direction different from the first direction.

2. The liquid crystal display unit as recited in claim 1, wherein the outermost display edge portion comprises a supporting member for the display portion.

3. The liquid crystal display unit as recited in claim 1, wherein the outermost display edge portion is adjacent to an end of a character displayed on the display portion.

4. The liquid crystal display unit as recited in claim 1, wherein the display portion and the pattern wiring area are being formed of a film.

5. The liquid crystal display unit as recited in claim 1, wherein the display portion and the pattern wiring area are being formed of a resin molding.

6. The liquid crystal display unit as recited in claim 1, further comprising a casing having a side wall supporting the pattern wiring area extending from the outermost display edge portion.

7. The liquid crystal display unit of claim 1, wherein the pattern wiring area is bent along a fold line extending substantially parallel to the outermost display edge portion.

8. The liquid crystal display unit of claim 7, wherein the fold line is spaced from the outermost display edge portion.

9. An electronic apparatus including a liquid crystal display unit comprising:
    a display portion having a display surface extending along a first direction, and a pattern wiring area extending from an outermost display edge portion of the display portion, the outermost display edge portion being arranged within the electronic apparatus to display visual information; and
    wherein the pattern wiring area of the display portion is bent relative to the display surface such that the pattern wiring area extends along a second direction different from the first direction.

10. The electronic apparatus as recited in claim 9, wherein the pattern wiring area is connected to a circuit substrate so as to support the display portion.

11. The electronic apparatus as recited in claim 9, wherein the pattern wiring area is adjacent to an end of a character displayed on the display portion.

12. The electronic apparatus as recited in claim 9 wherein the display portion and the pattern wiring area are being formed of a film.

13. The electronic apparatus as recited in claim 9 wherein the display portion and the pattern wiring area are being formed of a resin molding.

14. The electronic apparatus as recited in claim 9 further comprising a casing having a side wall being engaged with the edge portion.

15. The electronic apparatus of claim 9, wherein the pattern wiring area is bent along a fold line extending substantially parallel to the outermost display edge portion.

16. The electronic apparatus of claim 15, wherein the fold line is spaced from the outermost display edge portion.

17. A liquid crystal display unit comprising:
    a display portion having a display surface extending along a first direction, and a pattern wiring area extending from an outermost display edge portion of the display portion, the outermost display edge portion being formed within the liquid crystal display unit to display visual information; and
    wherein the pattern wiring area of the display portion is bent relative to the display surface such that the pattern wiring area extends along a second direction different from the first direction such that the display unit is formed into a predetermined shape.

18. The liquid crystal display unit as recited in claim 14, wherein the pattern wiring area extends along a direction substantially perpendicular to the first direction.

19. The liquid crystal display unit as recited in claim 17, wherein the pattern wiring area is connected to a circuit substrate so as to support the display portion.

20. The liquid crystal display unit as recited in claim 17, wherein the pattern wiring area is adjacent to an end of a character displayed on the display portion.

21. The liquid crystal display unit as recited in claim 17, wherein the display portion and the pattern wiring area are being formed of a film.

22. The liquid crystal display unit as recited in claim 17, wherein the display portion and the pattern wiring area are being formed of a resin molding.

23. The liquid crystal display unit as recited in claim 17, further comprising a casing having a side wall supporting the pattern wiring area extending from the outermost display edge portion.

24. The liquid crystal display unit of claim 17, wherein the pattern wiring area is bent along a fold line extending substantially parallel to the outermost display edge portion.

25. The liquid crystal display unit of claim 24, wherein the fold line is spaced from the outermost display edge portion.

26. A liquid crystal display installed into an electronic apparatus having a display window and a circuit substrate, comprising:

a display portion having a rear face, a front face extending along a first direction and configured to display a character facing the display window, and a pattern wiring area extending from an outermost display edge portion of the front face of the display portion, the outermost display edge portion being configured within the electronic apparatus so as to display visual information, and the pattern wiring area being configured to bend and extend along a second direction different from the first direction; and a flexible substrate electrically connected to the pattern wiring area, and having a LCD driver and a substrate connection portion facing the rear face of the display portion and connected to the circuit substrate.

27. The liquid crystal display unit of claim 26, wherein the pattern wiring area is bent along a fold line extending substantially parallel to the outermost display edge portion.

28. The liquid crystal display unit of claim 27, wherein the fold line is spaced from the outermost display edge portion.

* * * * *